US005620507A

United States Patent [19]

Oborne et al.

[11] Patent Number: 5,620,507

[45] Date of Patent: Apr. 15, 1997

[54] CANISTER FOR CONTAINING A BED OF PARTICLES

[75] Inventors: Terence Oborne; David Peacey; John Rogers, all of Yeovil, Great Britain

[73] Assignee: Normalair-Garrett (Holdings) Limited, Yeovil, England

[21] Appl. No.: 494,879

[22] Filed: Jun. 26, 1995

[30] Foreign Application Priority Data

Jun. 27, 1994 [GB] United Kingdom ................ 9412856.8

[51] Int. Cl.[6] .................................................. B01D 53/047

[52] U.S. Cl. .................................. 96/149; 96/137; 55/475

[58] Field of Search ................................. 55/475; 96/108, 96/137, 139, 149

[56] References Cited

U.S. PATENT DOCUMENTS

| | | | |
|---|---|---|---|
| 3,464,186 | 9/1969 | Hankison et al. | 96/139 X |
| 3,628,314 | 12/1971 | McCarthy et al. | 96/149 |
| 3,767,367 | 10/1973 | Rio | 128/142 X |
| 4,029,486 | 6/1977 | Frantz | 96/137 |
| 4,131,442 | 12/1978 | Frantz | 96/137 |
| 4,261,715 | 4/1981 | Frantz | 96/137 |
| 4,266,539 | 5/1981 | Parker et al. | 96/137 X |
| 4,336,042 | 6/1982 | Frantz et al. | 55/475 X |
| 4,665,050 | 5/1987 | Degen et al. | 502/402 |
| 4,981,655 | 1/1991 | Kolbe et al. | 422/165 |
| 5,038,767 | 8/1991 | Jumpertz | 128/202.26 |
| 5,098,453 | 3/1992 | Turner et al. | 96/149 |
| 5,122,172 | 6/1992 | Sherwood et al. | 96/149 |
| 5,186,522 | 2/1993 | Spencer | 96/137 X |
| 5,427,609 | 6/1995 | Zoglman et al. | 96/149 X |

FOREIGN PATENT DOCUMENTS

| | | | |
|---|---|---|---|
| 0129304 | 12/1984 | European Pat. Off. . | |
| 297928 | 11/1919 | Germany . | |
| 1-266834 | 10/1989 | Japan | 96/149 |

*Primary Examiner*—Robert Spitzer
*Attorney, Agent, or Firm*—Larson & Taylor

[57] ABSTRACT

A canister for containing a bed of particles, for example sorbent particles, which includes a loading device for applying a predetermined compressive load to the bed of particles and an adjusting device for automatically adjusting the loading device to maintain substantially the predetermined compressive load. The adjusting device functions in conjunction with the pressure of an operating fluid in the canister.

9 Claims, 3 Drawing Sheets

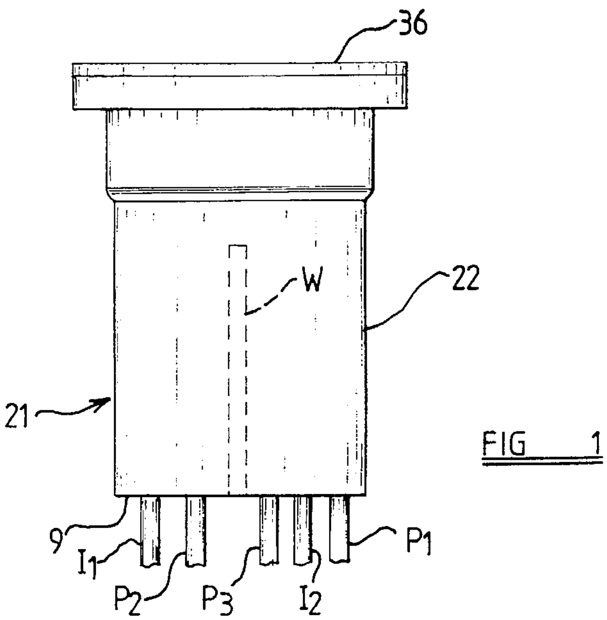
FIG 1
FIG 2
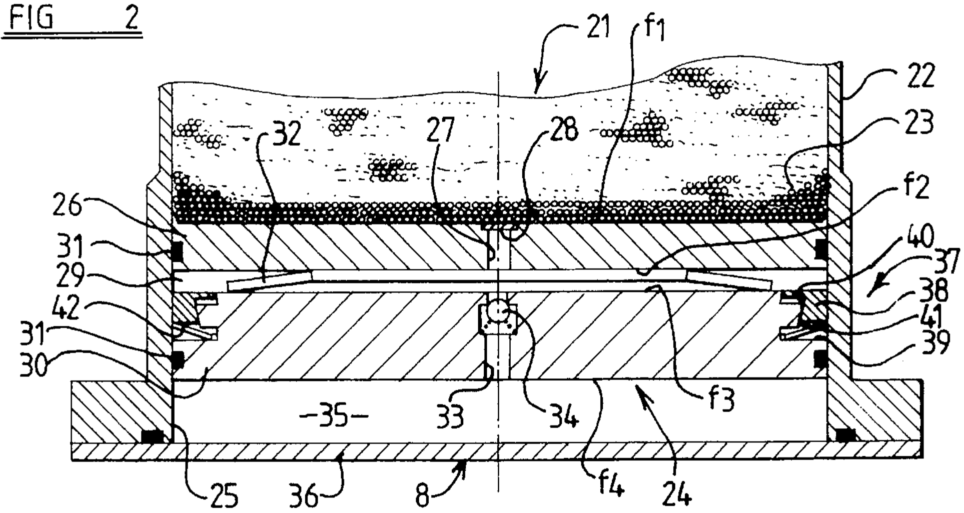
FIG 3
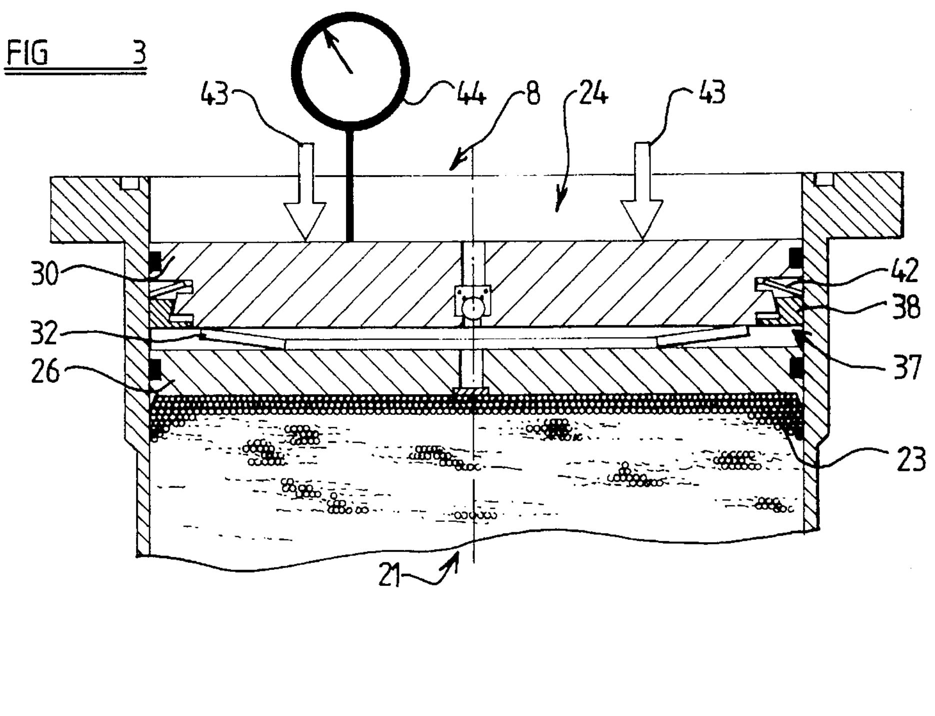

CANISTER FOR CONTAINING A BED OF PARTICLES

BACKGROUND OF THE INVENTION

1. Field of the Invention

This invention relates to canisters for containing a bed of particles and more particularly but not exclusively to a canister for containing a bed of inorganic sorbent particles being a molecular sieve bed providing oxygen enriched air in an aircraft on-board oxygen generating system.

2. Description of the Prior Art

An aircraft on-board oxygen generating system (OBOGS) is described and illustrated in EP-A-0129304. The system illustrated in FIG. 1 of this reference has three canisters filled with suitable molecular sieve sorbent particulate material in provision of three so-called molecular sieve beds. Each canister has a weir plate extending internally of the canister from one end thereof and terminating short of the opposite end. In operation supply fluid, in this case air, enters one end of the canister at one side of the weir plate, flows through the molecular sieve material parallel to the weir plate, is turned around at the opposite end of the weir plate to return upon itself through tire sieve material on the opposite side of the weir plate before exiting the canister as product fluid, in this case oxygen-enriched air.

A problem encountered with the use of sorbent particles in such an installation is that of generation of sorbent dust which can contaminate the product fluid leaving the molecular sieve beds. Such sorbent dust can be generated if the sorbent bed becomes fluidized, i.e. if the particles of sorbent are moved by the pressurised fluid passing through the bed, causing collision with and/or abrasion against one another, generating the dust.

It has been proposed to avoid fluidization by compressing the sorbent particles using a Belleville spring device bearing against one end of the bed, however, a problem with such an arrangement is that with sieve bed settlement, the spring eventually runs out of travel so that further fluidization reduces the compressive load thereby resulting in dust generation.

A proposed solution disclosed in U.S. Pat. No. 4,665,050 immobilizes the inorganic sorbent particles by binding them to each other with a polymeric binding material; however, it has been found that in use beds of such immobilised particles are less efficient than a bed of "free" particles. In particular, the volume flow of product fluid is reduced so that to obtain a given volume flow a larger bed must be provided if the sorbent particles are immobilised and this may be unacceptable in an aircraft OBOGS where space required for housing the system must be kept to a minimum.

An object of the present invention is the provision of a new or improved canister for containing a bed of particles which overcomes or reduces the aforementioned problems.

SUMMARY OF THE INVENTION

Accordingly, in its broadest aspect, the present invention provides a canister for containing a bed of particles including loading means for applying a predetermined compressive load to the bed of particles, and means for automatically adjusting the loading means to maintain substantially the predetermined compressive load.

The loading means may comprise piston means slidable in the canister along a longitudinal axis thereof, and means for subjecting the piston means during operation to an operating fluid pressure acting to urge the piston means toward the particles so that a predetermined compressive load is applied to the particles, and lock means for restraining movement of the piston means away from the particles whilst allowing movement of the piston means towards the particles.

In one embodiment the loading means comprises a first piston axially slidable in the canister so as to contact the particles, a fluid passageway for communicating fluid in the bed with a first chamber defined in part by the opposite end face of the first piston and an end face of a second piston which is axially slidable in the canister, spring means in the first chamber acting to bias the pistons away from each other and a fluid passageway including non-return valve means communicating the first chamber with a second chamber defined in part by the opposite end face of the second piston.

The effective surface areas of the first and second pistons may be substantially equal.

In another embodiment the piston means comprises axially spaced-apart first and second pistons joined by a central piston rod which is axially slidable in an opening in a canister transverse dividing wall, the first piston having an end face for supporting particles of smaller effective cross sectional area than that of an effective opposite end face of the second piston, the piston means having a fluid passage incorporating non-return valve means whereby, in operation, fluid in the bed of particles may flow to a chamber at the effective opposite end face of the second piston.

The lock means may comprise a split locking ring located in an annular groove in the circumference of the second piston and having an internal tapered surface mating with an external tapered surface on the piston, and spring means acting to bias the split ring tapered surface into engagement with piston tapered surface so that split ring is urged radially outwardly to effect locking of the second piston with respect to an internal chamber of the canister.

Alternatively, the lock means may comprise a spring means, such as an annular spring attached to the second piston and having a lip portion projecting radially outwardly from the circumference of the piston for engagement in one of a series of annular ratchet grooves provided in the surface of an internal chamber surface of the canister.

BRIEF DESCRIPTION OF THE DRAWINGS

The invention will now be described by way of example only and with reference to the accompanying drawings in which:

FIG. 1 is an illustrative side view of a molecular sieve bed canister in accordance with the invention;

FIG. 2 is a fragmentary sectioned view to an enlarged scale of one end of the canister of FIG. 1 containing inorganic sorbent particles and constructed in accordance with one embodiment of the invention;

FIG. 3 is a fragmentary sectioned view of the canister end shown in FIG. 2 when inverted and partially assembled to illustrate a setting up procedure;

DESCRIPTION OF PREFERRED EMBODIMENTS

Figure 4:
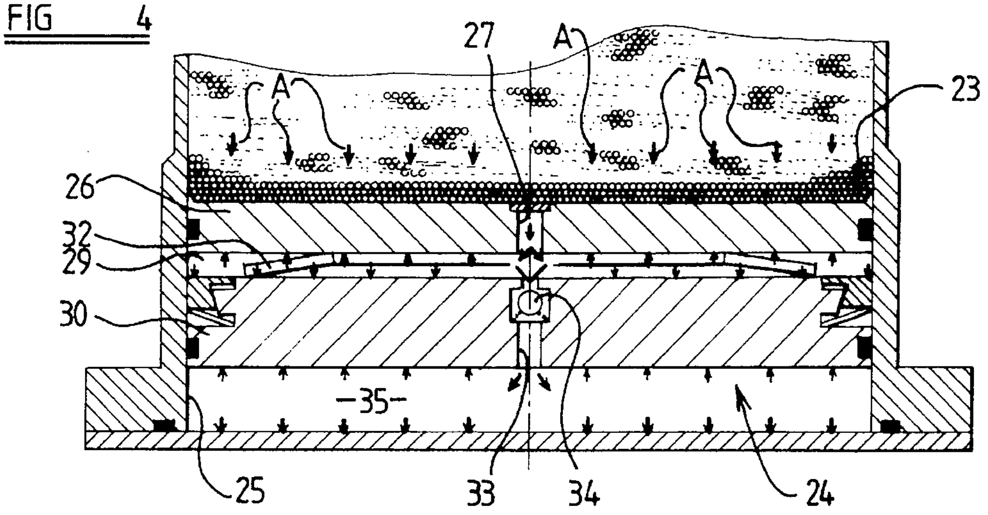
FIGS. 4 to 7 inclusive illustrate operational features of the canister of FIG. 2.

Referring now to FIGS. 1 and 2, a canister 21 having a generally tubular body 22 contains inorganic sorbent particles generally indicated at 23 in provision of a sorbent bed which is divided by a weir plate W extending from one end 9 of the canister 21 and terminating short of the opposite end 8. This canister 21 is particularly, but not exclusively, suitable for use as a molecular sieve bed container in an aircraft OBOGS.

Thus the one end 9 of the canister 21 may have an inlet $I_1$, for compressed air, to one side of the weir plate W, an outlet $P_1$, for oxygen enriched air at an opposite side of the weir plate, as well as a vent outlet $P_2$ to atmosphere, and a further inlet $I_2$ and outlet $P_3$ for purging air supply during regeneration phase of the sorbent bed.

Each inlet $I_1$, $I_2$ and outlet $P_1$–$P_3$ may be protected by filter means (not shown) to prevent ingress of sorbent particles into the inlets/outlets.

The canister 21 may be operated as described in our prior European Patent 0129304.

Referring more particularly to FIG. 2, the inner construction of the canister 21 will now be described.

Mechanical loading means, generally indicated at 24, is located in a tubular internal bore 25 (although this may not be provided actually by boring) at the illustrated end 8 of the canister 21. The loading means 24 includes a first piston 26 which is axially slidable along the tubular bore 25 for contacting the particles 23. The first piston 26 has a fluid passageway 27 protected by filter means 28 to prevent ingress of the particles 23 into the passageway. The passageway 27 extends between opposite end faces $f_1$, $f_2$, of the piston 26, $f_1$ being the face which contacts the particles, and communicates with a first chamber 29 located between the first piston 26 and a second piston 30 which is also axially slidable in the bore 25.

Seals 31 on the first and second pistons 26 and 30 prevent fluid leakage during operation.

A spring 32, in this example being a dished spring, is located in the first chamber 29 and acts to bias the first 26 and second 30 pistons away from each other along the longitudinal axis of the canister 21.

The second piston 30 has a fluid passageway 33 extending between opposite end faces $f_3$, $f_4$ thereof and incorporating a non-return valve 34 which permits pressurised fluid to flow from the first chamber 29 at face $f_3$ and the piston 30 into a second chamber 35 defined by the bore 25 of the canister 21 the end face $f_4$ of the second piston 30 and a coverplate 36 which is attached to the end of the tubular body 22.

Means for locking the second piston 30 against movement away from the first piston 26 is generally indicated at 37. This locking means 37 comprises a split locking ring 38 located in groove 39 provided in a circumferential surface of the piston 30. The split locking ring 38 has a tapered internal surface 40 which mates with a tapered external surface 41 of the piston 30. A spring 42 also located in the groove 39 acts to bias the locking ring 38 towards engagement of the tapered surfaces 40 and 41 so that the locking ring 38 is urged radially outwardly into engagement with the internal bore 25 of the canister 21 thereby locking the second piston 30 against movement along the bore 25.

Setting up of the loading means 24 in this embodiment of the invention will now be described with reference to FIG. 3. The canister 21 is inverted and filled with sorbent particles 23 to a desired level. First piston 26, spring 32 and second piston 30 are then slid into the tubular bore 25 so that the end face $f_1$ of the first piston 26 contacts the particles 23. A predetermined load, as indicated by arrows 43, is applied to the outer end face $f_4$ of the second piston 30 and checked by an appropriate gauge 44. Such load is conveniently applied mechanically to the piston 26. The magnitude of the applied load is predetermined to be equal to a load that in operation of a system of which the canister 21 forms part, is applied to the outer face $f_4$ of the second piston 30 by a maximum operating fluid pressure existing in the canister 21 and which is present in the second chamber 35 by having been communicated to chamber 35 via passageway 27, first chamber 29, and passageway 33 incorporating non-return valve 34.

The applied load 43 compresses the spring 32 and the spring loading biases the first piston 26 to move inwardly along the bore 25 to compress the particles 23. On removal of the predetermined setting up load 43, the loading of spring 32 acts to urge the second piston 30 towards the open outer end 8 of the bore 25. However, this action, assisted by that of the spring 42, forces the mating tapered surfaces 40 and 41 into further engagement so that the split locking ring 38 is urged radially outwardly to lock the second piston 30 against the inner surface of the bore 25 thereby preventing substantial movement of the second piston 30 away from the first piston 26.

The cover plate 36 (FIG. 2) is then attached to the end of the tubular bore 25 of the canister 21 to close the second chamber 35.

Operation of the canister 21 in accordance with this embodiment of the invention will now be described with reference to FIGS. 4 to 7 inclusive. As shown in FIG. 4, product fluid, e.g. compressed air, flowing through the bed of sorbent particles 23, is indicated by the arrows A. This fluid also flows by way of passageway 27 into the first chamber 29 and then by way of passageway 33 and non-return valve 34 into the second chamber 35. Operating fluid pressure exists, therefore, in both the first 29 and second 35 chambers.

Since both of the first and second pistons 26 and 30 have substantially equal effective end surface $f_1$–$f_4$ areas, they are balanced by the operating fluid pressure, and the first piston 26 remains loaded by the compression of spring 32 to maintain the desired compressive load on the particles 23.

Figure 5:
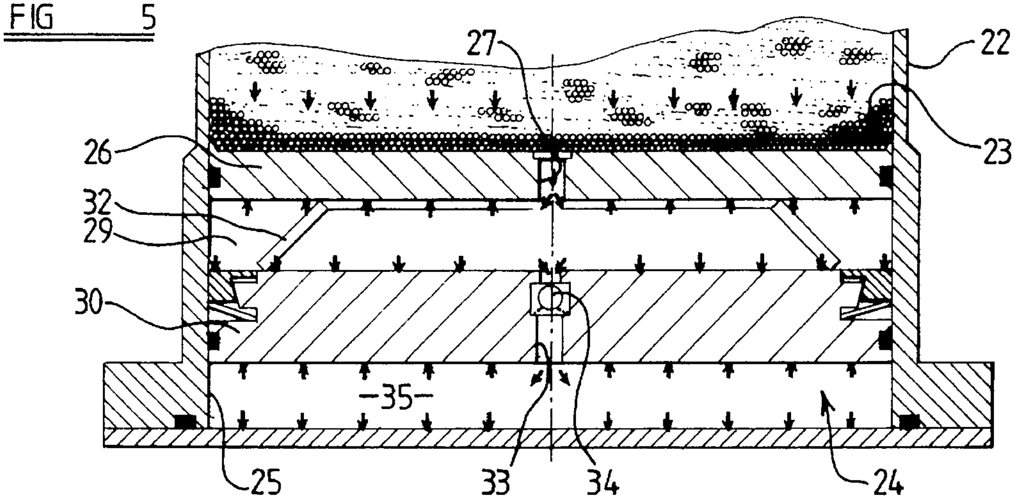

Should fluidization or settling of the particles 23 occur for any reason during operation, the compression loading of spring 32 would tend to move the first piston 26 along the bore 25 to maintain the desired compression loading on the particles 23, as shown in FIG. 5.

As is well known, during normal operation of a bed of sorbent particles 23, the fluid pressure is reduced cyclically to permit purging of the particles 23, e.g. to remove nitrogen therefrom to regenerate the bed of particles 23. When such a fluid pressure reduction occurs in the canister 21 of this invention, the fluid pressure in the first chamber 29 also falls whereas the fluid pressure in the second chamber 35 remains substantially at the maximum operating pressure due to closing of the non-return valve 34 in passageway 33. The higher pressure in chamber 35 acts on the outer end surface $f_4$ of the second piston 30 to move the second piston 30 towards the first piston 26 to re-establish the compressive loading of the spring 32 which will have reduced due to the movement of the first piston 26.

Figure 6:
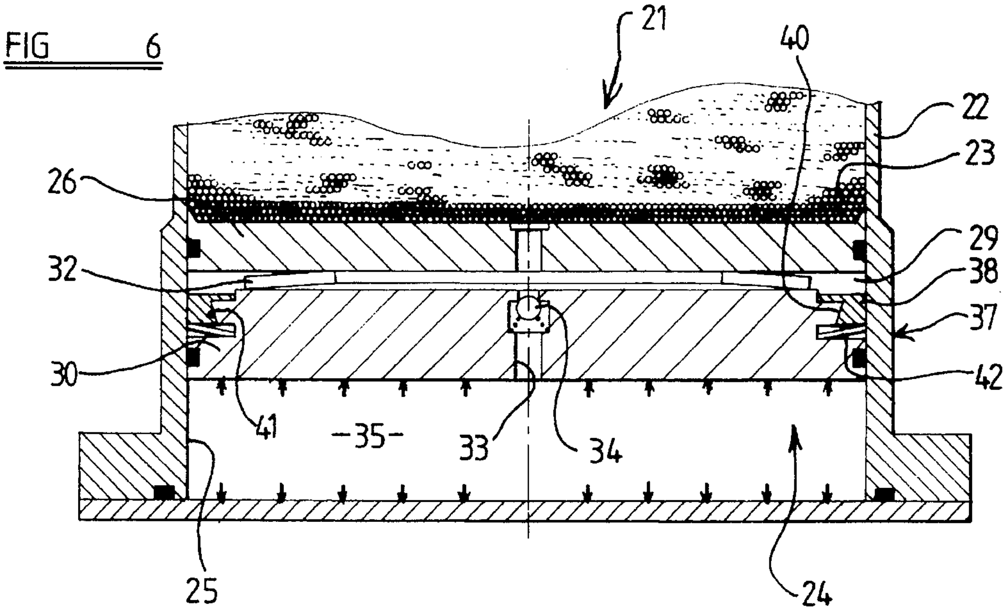

This movement of the second piston 30 towards the first piston 26 is facilitated by compression of the spring 42 which allows the split locking ring 38 to unlock and the second piston to move inwardly towards the first piston as shown in FIG. 6. Once equilibrium is achieved the locking ring 38 is moved by the spring 42 to re-establish locking of the second piston 30 onto the tubular bore 25 of canister 21.

Figure 7:
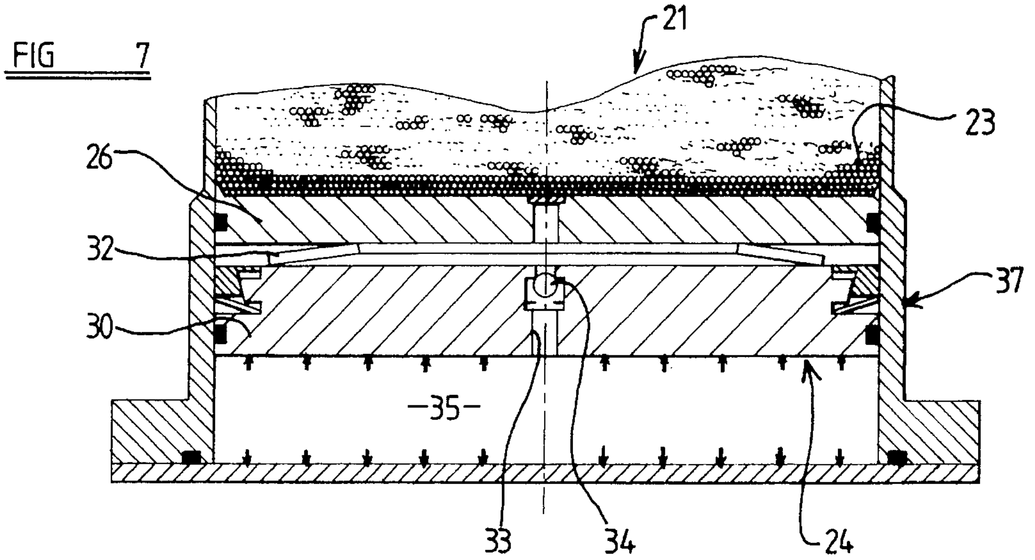

In the event of shut down of the system of which the canister 21 forms part, and subsequent venting of pressurised fluid from the particles 23, e.g. via outlet $P_2$ shown in FIG. 1, the fluid pressure retained within the second chamber 35 forces the second piston 30 towards the first piston 26 to further compress spring 32, as shown in FIG. 7, to re-establish the desired pre-loading of the spring 32 until it is equal to the predetermined load 43 initially set thereby maintaining the desired compressive loading on the particles 23.

The second piston 30 is locked in its new position by the lock means 37 as hereinbefore described.

Figure 8:
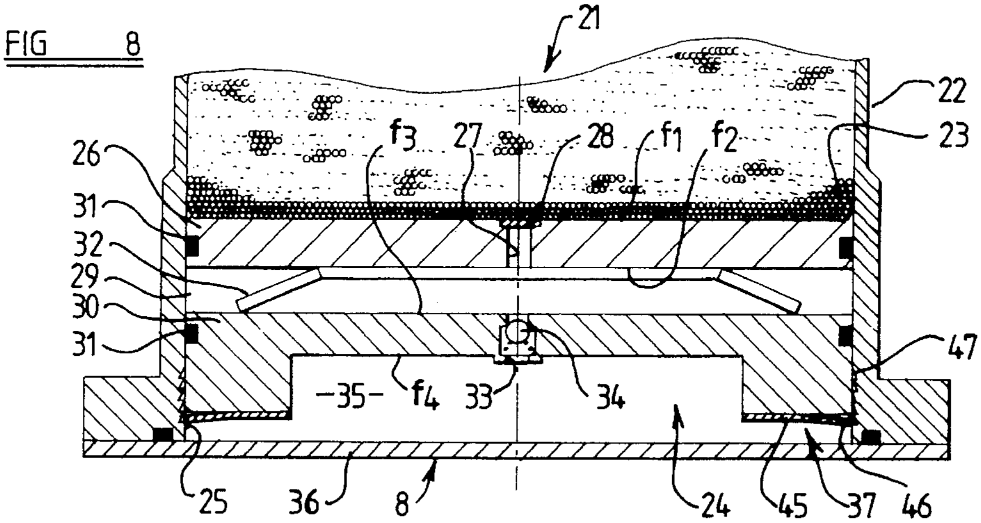
FIG. 8 is a fragmentary sectioned view of one end of a canister constructed in accordance with another embodiment.

The embodiment of FIG. 8 is similar in most respects with the embodiment of FIG. 2 and although a detailed description is not essential like reference numerals are included in FIG. 8 to aid understanding. The modification introduced in the embodiment of FIG. 8 is concerned with the lock means 37 associated with the second piston 30.

The lock means 37 of this embodiment is a ratchet type mechanism comprising an annular spring 45 attached to an outer end face $f_4$ of the second piston 30 and having a lip portion 46 protruding radially outwardly of the circumference of the second piston 30 for engagement in one of a plurality of ratchet grooves 47 cut in the surface of the tubular bore 25 over a length thereof.

The set-up procedure and operation of the canister 21 in the embodiment of FIG. 8 is similar to that of the canister 21 in the embodiment of FIG. 2 except that it is the engagement of the lip portion 46 in the grooves 47 which both permits movement of the second piston 30 toward the first piston 26 to compress the spring 32, and which prevents movement of the second piston 30 away from the first piston 26 by locking the second piston in the bore 25.

Figure 9:
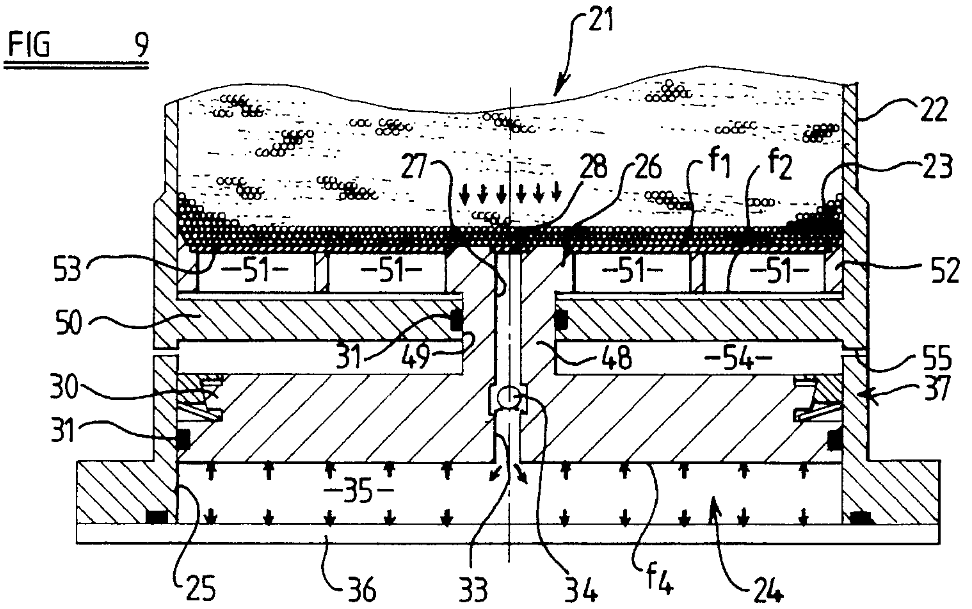
FIG. 9 is a fragmentary sectioned view of a canister constructed according to a yet further embodiment.

In the embodiment of FIG. 9, the first piston 26 and second piston 30 are joined by a central rod 48 axially slidable in an opening 49 in a canister dividing wall 50 which extends transversely. The outer face $f_4$ of the second piston 30 again has an effective area equal to that of the tubular bore 25 of the canister 21 whereas the face $f_1$ of the first piston 26 which contains the particles 23 has a much reduced effective surface area due to the provision of a plurality of apertures 51 extending between opposite end surfaces $f_1$, $f_2$ thereof. Piston 26 supports, between its central effective area and an outer annular ring portion 52 slidable in the tubular bore 25, a fluid porous annular plate 53 which permits the passage of pressurised fluid but is capable of supporting and compressing the particles 23.

An annular space 54 between the dividing wall 50 and the second piston 30 is open to atmosphere by way of a vent 55. The passageway 33 incorporating the non-return valve 34 extends through the central rod 48 to permit fluid pressure in the bed of particles 23 to be communicated to the second chamber 35 between the second piston 30 and the cover plate 36.

Lock means 37 associated with the second piston 30 is identical to that shown and described with reference to the embodiment of FIG. 2.

In the setting up of the canister 21 of this embodiment the predetermined load applied to the second piston 30 while the canister 21 is inverted is transmitted through the rod 48, first piston 26 and support plate 53 directly to compress the particles 23.

During normal operation of this embodiment, sealed second chamber 35 is pressurised by way of passageway 33 and non-return valve 34, and due to the larger surface area of outer face $f_4$ of the second piston 30, compared with the effective surface area of the end face $f_1$ of the first portion 26, the second piston 30 and with it the first piston 26 is moved to maintain a compressive loading on the particles 23. The lock means 37 permits continual adjustment and locking during operation, as well as adjustment and locking when a system embodying the canister 21 is purged or shut down as hereinbefore described with respect to the embodiment of FIG. 2.

Whilst a canister in accordance with the present invention is particularly suited for use in an aircraft OBOGS it may, when filled with appropriate inorganic sorbent particles, be used to advantage in many commercial and industrial applications in which it is desired to remove, using a sorbent material, one or more components from a fluid, i.e. a gas or a liquid, before the fluid can be used for a particular purpose.

The present invention provides a canister for containment of inorganic sorbent particles in provision of a sorbent bed, the canister including loading means that continuously maintains a predetermined compressive loading on the particles and which, on purging and/or shut down of a system in which the canister is employed, automatically re-establishes the predetermined compressive load on the particles in the event of settlement or fluidization of the bed having taken place.

It is to be appreciated that the invention is not limited by the several embodiments hereinbefore described and illustrated in the accompanying drawings, other modifications being possible without departing from the scope of the invention.

For example, in a non-illustrated embodiment the canister may have a tubular weir plate which is concentric with a longitudinal axis of the canister. In this non-illustrated embodiment provision may be made for supply fluid to enter the bed at the end of the canister opposite to the loading means and to flow through that part of the bed which is external of the weir plate before returning upon itself through that part of the bed which is internal of the weir plate and exiting the canister as product fluid.

We claim:

1. A canister for containing a bed of particles through which in one part of an operating cycle an operating fluid is passed at a normal operating pressure, the canister including load means for applying a predetermined compressive load to the bed of particles, the loading means comprising piston means slidable in the canister along a longitudinal axis thereof, there being means when the canister is operating in a second part of the operating cycle having a reduced operating pressure, for subjecting the piston means to the normal operating pressure of the operating fluid to urge the piston means towards the particles so that the loading means is automatically adjusted to maintain substantially the predetermined compressive load.

2. A canister according to claim 1 wherein the piston means comprises a first piston axially slidable in the canister so as to contact the particles a fluid passageway for communicating fluid in the bed with a first chamber defined in part by the opposite end face of the first piston and an end face of a second piston which is axially slidable in the canister, spring means in the first chamber acting to bias the pistons away from each other and a fluid passageway including non-return valve means communicating the first chamber with a second chamber defined in part by the opposite end face of the second piston.

3. A canister according to claim 2 wherein the effective surface areas of the first and second pistons are substantially equal.

4. A canister according to claim 1 wherein the piston means comprises axially spaced-apart first and second pistons joined by a piston rod means which is axially slidable in an opening in a canister transverse dividing wall the first piston having an end face for supporting particles being of smaller effective cross sectional area than that of an effective opposite end face of the second piston, the piston means having a fluid passage incorporating non-return valve means whereby, in operation, fluid in the bed of particles can flow to a chamber at the effective opposite end face of the second piston.

5. A canister according to claim 1 in which lock means are provided for restraining movement of the piston means away from the particles whilst allowing movement of the piston means towards the particles when the canister is operating in the second part of the operating cycle.

6. A canister according to claim 5 wherein the lock means comprises a split locking ring located in an annular groove in the circumference of a piston of the piston means and having an internal tapered surface meeting with an external tapered surface on the piston and there being means acting to bias the split ring tapered surface into engagement with the piston tapered surface so that the split ring is urged radially outwardly to effect locking of the piston with respect to an internal chamber surface of the canister.

7. A canister according to claim 6 wherein the means which acts to bias the split ring tapered surface into engagement with the piston tapered surface comprises a spring means which acts between the first mentioned piston of the piston means and a second piston of the piston means to bias the pistons away from eachother.

8. A canister according to claim 5 wherein the lock means comprises spring means attached to a piston of the piston means and having a lip portion projecting radially outwardly from the circumference of the piston for engagement in one of a series of annular ratchet grooves provided in the surface of an internal chamber surface of the canister.

9. A canister according to claim 1 in which the particles are sorbent particles through which is passed during the one part of the operating cycle of the canister, fluid at the normal operating pressure and during the second part of the operating cycle the fluid pressure of the operating fluid is reduced to permit purging of the sorbent particles.

* * * * *